United States Patent
Kaneko et al.

(10) Patent No.: US 7,748,276 B2
(45) Date of Patent: Jul. 6, 2010

(54) MANUFACTURING METHOD OF PRESSURE SENSOR AND PRESSURE SENSOR

(75) Inventors: Yoshikazu Kaneko, Tokyo (JP); Hiroshi Kodama, Tokyo (JP); Hiroshi Wakabayashi, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 5 days.

(21) Appl. No.: 12/205,122

(22) Filed: Sep. 5, 2008

(65) Prior Publication Data

US 2009/0056462 A1 Mar. 5, 2009

(30) Foreign Application Priority Data

Sep. 5, 2007 (JP) ............... 2007-230322

(51) Int. Cl.
*G01L 9/04* (2006.01)

(52) U.S. Cl. .......................... 73/720; 73/726

(58) Field of Classification Search ........................ None
See application file for complete search history.

(56) References Cited

U.S. PATENT DOCUMENTS 4,306,460 A * 12/1981 Sakurai et al. ................ 73/721
2005/0210992 A1 * 9/2005 Tohyama et al. .............. 73/715
2008/0229838 A1 * 9/2008 Kleven et al. ................ 73/720

FOREIGN PATENT DOCUMENTS

| JP | 57-112988 | 7/1982 |
| JP | 04-348241 | 12/1992 |
| JP | 7-311109 | 11/1995 |
| JP | 11-147193 | 6/1999 |
| JP | 2001-246487 | 9/2001 |
| JP | 2002-195902 | 7/2002 |
| JP | 2006-038538 | 2/2006 |

* cited by examiner

*Primary Examiner*—Andre J Allen
(74) *Attorney, Agent, or Firm*—Rankin, Hill & Clark LLP

(57) ABSTRACT

A manufacturing method of a pressure sensor that includes a pressure detector having a bottomed cylindrical member with a bottom including a thin-wall portion and a strain detecting mechanism provided on one side of the bottom for detecting a strain of the bottom and a pressure-introducing joint for introducing the fluid to be measured into the bottomed cylindrical member is provided. The method includes: first welding for butt-welding an end of the cylindrical portion of the bottomed cylindrical member and an end of the pressure-introducing joint; and second welding for welding the pressure-introducing joint in parallel to a first weld bead formed by the first welding.

5 Claims, 6 Drawing Sheets

MANUFACTURING METHOD OF PRESSURE SENSOR AND PRESSURE SENSOR

BACKGROUND OF THE INVENTION

1. Field of the Invention

The present invention relates to a pressure sensor for converting a fluid pressure to an electric signal for measurement and a manufacturing method of the pressure sensor.

2. Description of Related Art

Traditionally, there has been used a pressure sensor for measuring pressure of a fluid such as gas and liquid, in which the fluid pressure is converted to an electric signal for measurement.

For instance, there is known a pressure sensor disclosed in Document 1: JP-A-2002-195902.

The pressure sensor includes: a metal stem having a diaphragm; a strain gauge bonded on the diaphragm; and a housing for introducing fluid into the metal stem, which is adapted for measuring the pressure of the fluid flowing in a pipe.

An opening of the metal stem is connected to a pressure-introducing channel of the housing by metal sealing, where the fluid is introduced inside the diaphragm of the metal stem via the pressure-introducing channel of the housing.

When the diaphragm is deformed on account of the pressure of the fluid introduced inside the metal stem, the strain gauge detects the strain as an electric signal. Then, the electric signal is amplified and converted to obtain a pressure value of the fluid.

Document 2 (JP-A-2006-38538) discloses a pressure sensor including: a bottomed cylindrical member having a thin bottom; a pressure detector provided at the bottom of the bottomed cylindrical member; and a pressure-introducing joint for introducing a fluid into the bottomed cylindrical member, the bottomed cylindrical member and the pressure-introducing joint being butt-welded.

According to the above arrangement, since the bottomed cylindrical member of a material with excellent mechanical strength and corrosion resistance and the pressure-introducing joint made of a material that is expensive and still is superior in corrosion resistance are welded, a pressure sensor with excellent corrosion resistance can be provided with low cost.

Incidentally, the traditional pressure sensor as disclosed in the Document 1 requires that the metal stem and the housing are rigidly fixed with a screw in order to prevent leakage of the fluid, so that contact surfaces between the metal stem and the housing are sealed in a collapsed manner.

Here, in order to ensure the sealing, the metal stem and the housing have to be processed with high accuracy. Further, extremely large force has to be applied with utmost attention in assembling the components.

On the other hand, when the metal stem and the housing are fastened with strong force, the metal stem is strained, which is transferred to the strain gauge to cause great deviation on the output thereof. Accordingly, a processing circuit for an electric signal has to be provided in order to correct the output deviation.

On the other hand, when different materials are welded as in the pressure sensor disclosed in the Document 2, strain is generated on account of the difference between the coefficients of thermal expansion of the materials. Such welding strain is smaller than the strain on account of fastening, however, is not small enough to be ignored in measurement. Accordingly, a correction process by the electric signal processing circuit is eventually required.

In addition, it is considered that such welding strain is gradually relaxed in accordance with aging, so that long-term stability of measurement may be impaired.

Incidentally, even when the same kind of materials are to be welded, strain occurs on account of, for example, evaporation of a part of molten metal during welding to cause volume reduction of the welded portion.

As an alternative option for preventing output deviation on account of strain of the component, it is possible that the bottomed cylindrical member is sufficiently lengthened to prevent transfer of the strain of the cylindrical portion of the bottomed cylindrical member to the strain gauge. However, such option is far from practical in view of increase in the entire size of the pressure sensor.

SUMMARY OF THE INVENTION

An object of the present invention is to provide a pressure sensor with reliable sealing and little output variation on account of components strain, and a method for manufacturing the pressure sensor.

A manufacturing method of a pressure sensor according to an aspect of the invention is for measuring a pressure of a fluid to be measured, the pressure sensor including: a pressure detector having a bottomed cylindrical member with a bottom including a thin-wall portion and a strain detecting mechanism provided on one side of the bottom for detecting a strain of the bottom; and a pressure-introducing joint for introducing the fluid to be measured into the bottomed cylindrical member; the method including: first welding for butt-welding an end of the cylindrical portion of the bottomed cylindrical member and an end of the pressure-introducing joint; and second welding for welding the pressure-introducing joint in parallel to a first weld bead formed by the first welding.

According to the above arrangement, an end of the cylindrical portion of the bottomed cylindrical member and an end of the pressure-introducing joint are initially butt-welded in the first welding. Accordingly, the cylindrical portion of the bottomed cylindrical member and the pressure-introducing joint can be highly reliably sealed.

At this time, the above-described welding strain is caused on the bottomed cylindrical member.

In the above arrangement, however, another welding is applied in the second welding on the pressure-introducing joint in parallel to the first weld bead. Thus, the welding strain generated in the first welding can be relaxed by the welding in parallel to the first weld bead.

In other words, a pressure sensor with reliable sealing and little output variation on account of components strain can be provided by the manufacturing method of the pressure sensor of the invention.

Further, since the pressure sensor thus produced exhibits extremely small strain on the bottomed cylindrical member, the processor for correcting the electric signal from the pressure detector can be simplified. Since the arrangement and the calibration process can be simplified, the pressure sensor can be provided with a low cost. Further, since the welding strain of the bottomed cylindrical member is extremely low, a pressure sensor that is excellent in long-term stability can be provided.

In the manufacturing method of the pressure sensor of the invention, the depth of the welding conducted in the second welding is preferably shallower than the depth of the welding conducted in the first welding.

In the manufacturing method of the pressure sensor of the invention, the depth of the welding conducted in the second welding is preferably in a range of 40% to 60% of the depth of the welding conducted in the first welding.

By setting the depth of the welding conducted in the second welding in the above range, the effect for relaxing the welding strain by the second welding can be maximized.

Incidentally, when the depth of the welding conducted in the second welding is less than 40% of the depth of the welding conducted in the first welding, sufficient relaxing effect of the welding strain cannot be obtained. On the contrary, when the depth of the welding conducted in the second welding is more than 60% of the depth of the welding conducted in the first welding, the relaxing effect of the welding strain also decreases.

In the manufacturing method of the pressure sensor of the invention, it is preferable that the first welding and the second welding are conducted by an electron beam welding.

In the electron beam welding, since the heating is performed by irradiating a high-density electron beam in vacuum, the welding can be completed within a short time. Further, the electron beam welding is widely available for welding different materials.

Further, the electron beam has a high energy density, and a deep welding in which an aspect ratio of a weld width and a weld depth is two or higher, and consequently, a welding joint can be performed without thermally affecting each of the bottomed cylindrical member, the pressure-introducing joint and the strain gauge.

In the manufacturing method of the pressure sensor of the invention, it is preferable that the strain detecting mechanism is a strain gauge.

Since a typical strain gauge is used as the strain detecting mechanism, the pressure sensor can be easily manufactured with low cost.

A pressure sensor according to another aspect of the invention for measuring a pressure of a fluid to be measured includes: a pressure detector having a bottomed cylindrical member with a bottom including a thin-wall portion and a strain detecting mechanism provided on one side of the bottom for detecting a strain of the bottom; a pressure-introducing joint for introducing the fluid to be measured into the bottomed cylindrical member; a first weld bead formed by butt-welding of an end of the cylindrical portion of the bottomed cylindrical member and an end of the pressure-introducing joint; and a second weld bead formed by welding the pressure-introducing joint in parallel to the first weld bead.

Such a pressure sensor manufactured by the above manufacturing method exhibits reliable sealing and little output variation on account of components strain.

DETAILED DESCRIPTION OF PREFERRED EMBODIMENT(S)

An embodiment of the present invention will be described with reference to the attached drawings.

Figure 1:
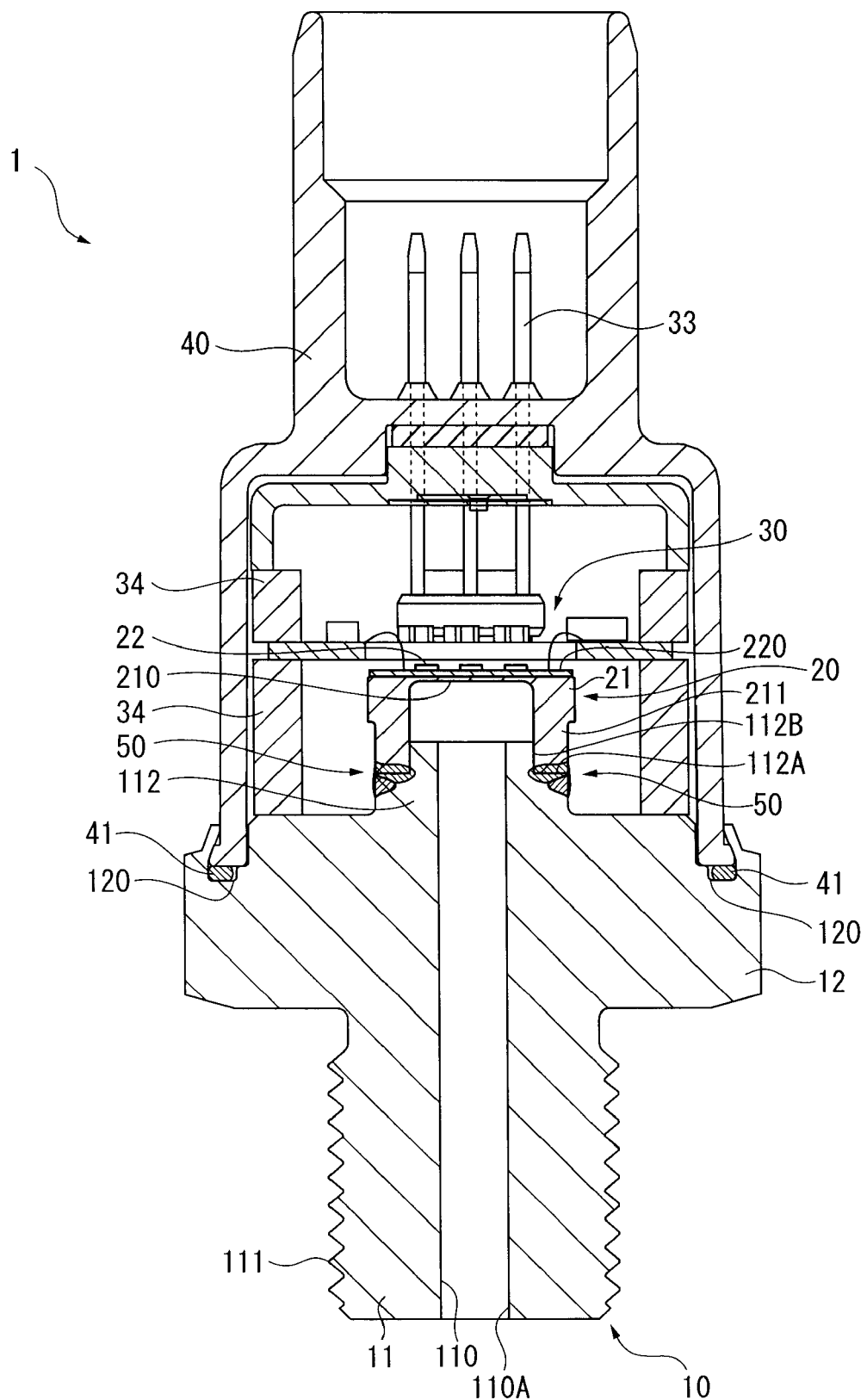
FIG. 1 is a front elevation showing a cross section of a pressure sensor according to an embodiment of the invention.

FIG. 1 shows a pressure sensor 1 manufactured by a manufacturing method of the pressure sensor according to the present embodiment.

As shown in FIG. 1, the pressure sensor 1 includes a pressure-introducing joint 10, a pressure detector 20, a circuit portion 30 and a housing 40. The pressure-introducing joint 10 and the pressure detector 20 are integrated by an electron beam welding to provide a weld portion 50 at the connection therebetween.

The pressure sensor 1 is adapted to measure a pressure of a fluid to be measured such as gas and liquid that flows in a pipe.

[Arrangement of Pressure Introducing Joint 10]

The pressure-introducing joint 10 is connected to the pipe (not shown) in which the fluid to be measured flows to feed the fluid flowing in the pipe to the pressure detector 20, in which a cylindrical portion 11 and a disc flange 12 are integrated.

The cylindrical portion 11 is formed substantially cylindrically, and a cylindrical space on the inner side thereof serves as a flow path 110 in which the fluid to be measured flows. An outer peripheral surface on a first end of the cylindrical portion 11 has a screw 111 screwed into the pipe (not shown), while a joint portion 112 to be jointed with the pressure detector 20 is provided on an outer circumference on a second end of the cylindrical portion 11.

One end of the flow path 110 on a side with the screw 111 being formed serves as a pressure-introducing port 110A from which the fluid fed from a circular pipe (not shown) is introduced.

The screw 111 is a spiral male thread groove, which is screwed into a female thread groove formed on an inner surface of the pipe (not shown).

The joint portion 112 includes an annular joint surface 112A and an annular step 112B, which are formed by carving the outer circumference of the second end of the cylindrical portion 11.

The disc flange 12 radially extends in a disc toward the outer side of the cylindrical portion 11 substantially at a middle position of the screw 111 and the joint portion 112 of the cylindrical portion 11. A fitting portion 120 in the form of a circular groove is formed on a peripheral portion of the disc flange 12 on a side with the pressure detector 20 being provided, the fitting portion 120 being fitted with the housing 40. A profile of the disc flange 12 exhibits a circle with two opposing portions being cut off or a hexagon, where a spanner is applied when the screw 111 is screwed into the pipe (not shown).

The material of the pressure-introducing joint 10 is not specifically limited as long as it allows welding, where, for instance, stainless steel such as austenitic stainless steel and martensitic precipitation hardened stainless steel, precipitation hardened Fe—Ni heat-resisting steel, mild steel, low-carbon steel and the like may preferably used.

[Arrangement of Pressure Detector 20]

The pressure detector 20 is an element for detecting the pressure of the fluid to be measured flowing in the pipe (not shown) as an electric signal, which includes a diaphragm 21 strained by the fluid pressure and a strain-detecting mechanism in the form of a strain gauge 22 that converts the strain into an electric signal. The diaphragm 21 is a bottomed cylindrical member, in which a thin-wall portion 210 as a bottom and a cylindrical portion 211 are integrated.

Any metal weldable material may be used for the material of the pressure detector 20, which may be the same material as the above-described pressure-introducing joint 10.

Incidentally, the pressure-introducing joint 10 and the pressure detector 20 may be provided by the same material or may be provided by different materials as long as alloy phase can be formed by welding.

The thin-wall portion 210 has a thin disc body. When the fluid to be measured acts on the portion, the thin-wall portion 210 is elastically deformed by the pressure of the fluid to be measured.

The cylindrical portion 211 is a cylinder with a thick sidewall. The thin-wall portion 210 is integrated so as to close a first end of the cylindrical portion 211. Entire circumferences of a second open end of the cylindrical portion 211 and the joint surface 112A of the pressure-introducing joint 10 are jointed by butt-welding. Inner and outer diameters of the second end of the cylindrical portion 211 correspond to those of the circular joint surface 112A of the joint portion 112 of the pressure-introducing joint 10.

After forming an insulating layer 220 entirely on the outer surface of the thin-wall portion 210, the strain gauge 22 is provided at one or more positions, preferably four positions, on the insulating layer, where the bridge circuit is formed to convert the strain of the thin-wall portion 210 to an electric signal to be output.

Each of the strain gauges 22 is provided with an electrode 221 (see FIG. 2) from which the electric signal is transmitted to the circuit portion 30. As the strain gauge 22, a conventional wire strain gauge technique can be employed.

The insulating layer 220 is provided for insulating conductivity between the strain gauge 22 and the diaphragm 21, in which a glass-containing adhesive, a polyimide adhesive or the like may be used. Alternatively, insulative silicon dioxide film, silicon nitride film and the like may be formed as the insulating layer. In order to accurately detect the strain of the thin-wall portion, it is required that the thin-wall portion 210, the insulating layer 220 and the strain gauge 22 are securely jointed with each other.

[Arrangement of Circuit 30]

Next, the circuit 30 will be described in detail with reference to the drawing.

Figure 2:
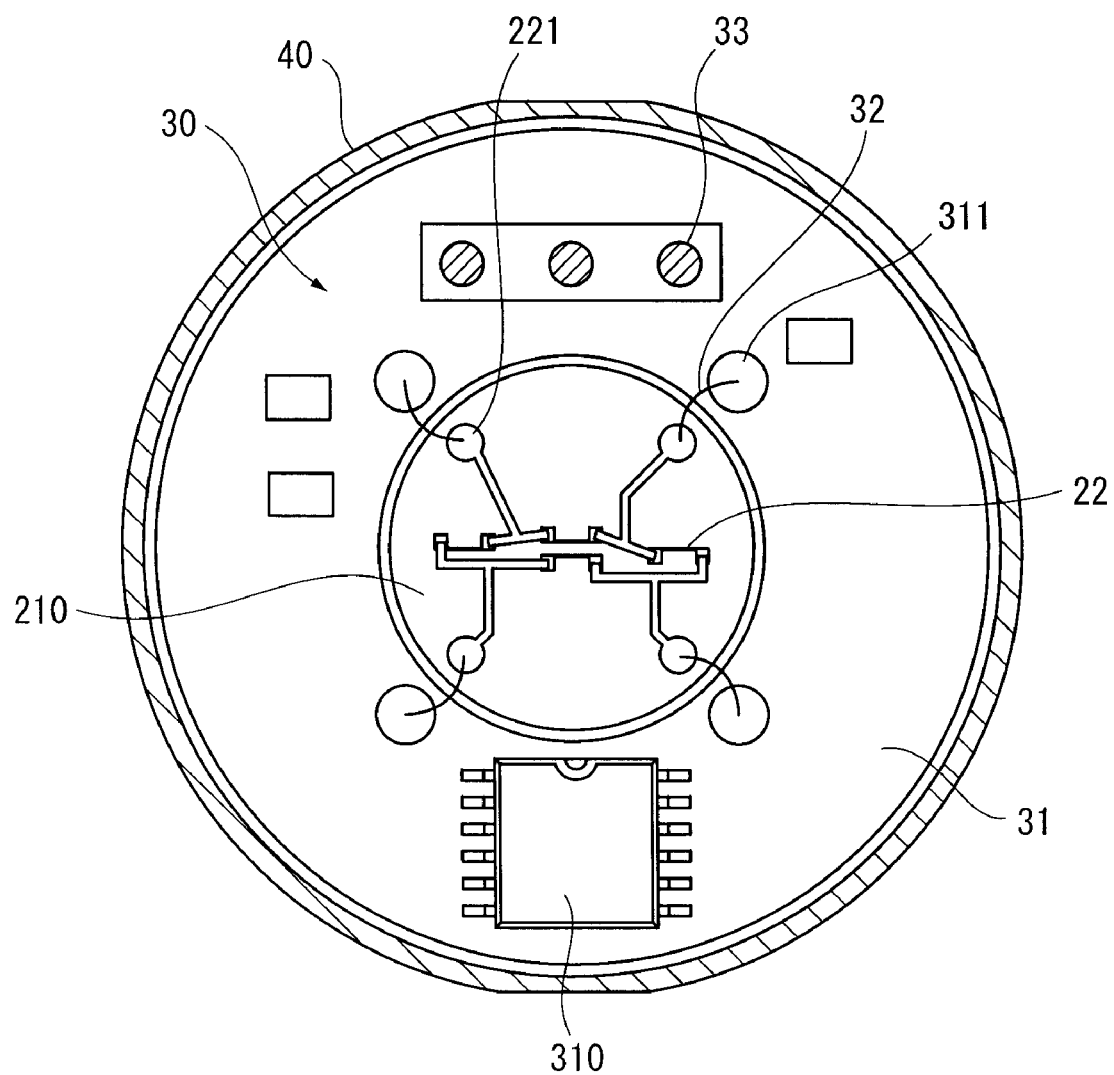
FIG. 2 is a plan view showing an arrangement of a circuit portion and a strain gauge provided on a diaphragm according to the embodiment.

FIG. 2 is a plan view showing an arrangement of a circuit portion 30 and a strain gauge 22 provided on the diaphragm 21 of the pressure sensor 1 according to the embodiment.

As shown in FIG. 2, the circuit portion 30 includes an annular-plate amplifier circuit board 31, a wire bond 32 and an input/output terminal 33. The circuit portion 30 amplifies the electric signal generated in the strain gauge 22 and transmitting the amplified electric signal to an outside.

A circuit component 310 and electrodes 311 are provided on the amplifier circuit board 31. The electrode 311 is connected to the electrode 221 of the strain gauge 22 by the wire bond 32 inside the amplifier circuit board 31.

The input/output terminals 33 include three terminals communicating an external terminal (not shown) and the circuit portion 30, the input/output terminal 33 outputting the electric signal of the strain gauge 22 amplified by the circuit component 310 to the external terminal while supplying a power from the external terminal to the circuit portion 30.

As shown in FIG. 1, an outer edge of the amplifier circuit board 31 is fixed by a cylindrical spacer 34.

[Arrangement of Housing 40]

In FIG. 1, the housing 40 is a protection casing having a substantially tubular shape for protecting the pressure detector 20 and the circuit portion 30 from moisture and dust intruding from the outside, an end of which has a gasket 41 engaged with the fitting portion 120 of the pressure-introducing joint 10.

[Arrangement of Weld Portion 50]

Next, a weld portion 50 will be described in detail with reference to the drawing.

Figure 3:
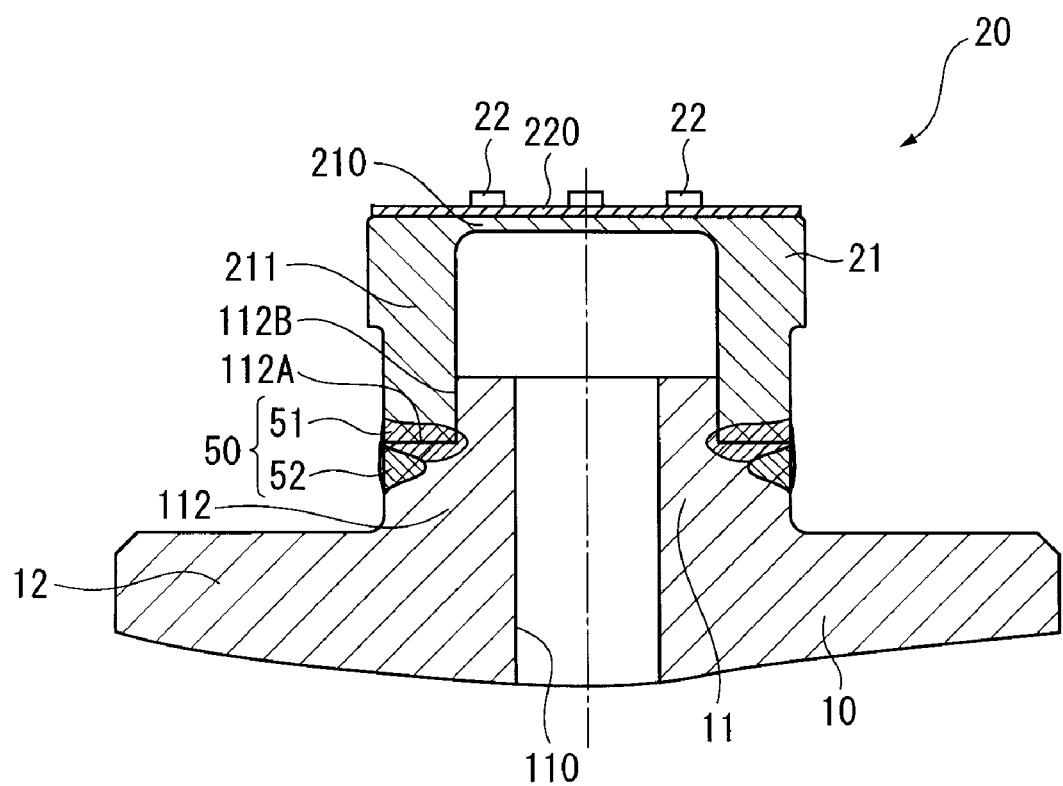
FIG. 3 is a front elevation showing a cross section of a weld portion according to the embodiment.

FIG. 3 is a front elevation showing a cross section of a weld portion 50 according to the present embodiment.

The weld portion 50 includes a first weld bead 51 and a second weld bead 52.

The first weld bead 51 is a section formed during a first welding, in which a joint surface 112A of the pressure-introducing joint 10 and the open end of the cylindrical portion 211 of the diaphragm 21 are welded by electron beam welding with the entire circumferences thereof being butted.

The second weld bead 52 is a section formed during a second welding for welding the pressure-introducing joint 10 in parallel to the first weld bead 51.

As shown in FIG. 3, the second weld bead 52 is preferably shallower than the first weld bead 51. The depth of the second weld bead is preferably in a range of 40% and 60% of the depth of the first weld bead. Incidentally, the depth of the second weld bead is more preferably in a range of 45% and 55% of the depth of the first weld bead, and is the most preferably 50% of the depth of the first weld bead.

[Manufacturing Method of Pressure Sensor]

A method for manufacturing the above-described pressure sensor 1 will be described below with reference to FIGS. 4 and 5.

In the present embodiment, the manufacturing method of the pressure sensor 1 includes the first welding for butt-welding an end of the cylindrical portion 211 of the diaphragm 21 and the joint surface 112A of the pressure-introducing joint 10 and the second welding for welding the pressure-introducing joint 10 in parallel to the first weld bead 51 formed by the first welding.

Figure 4:
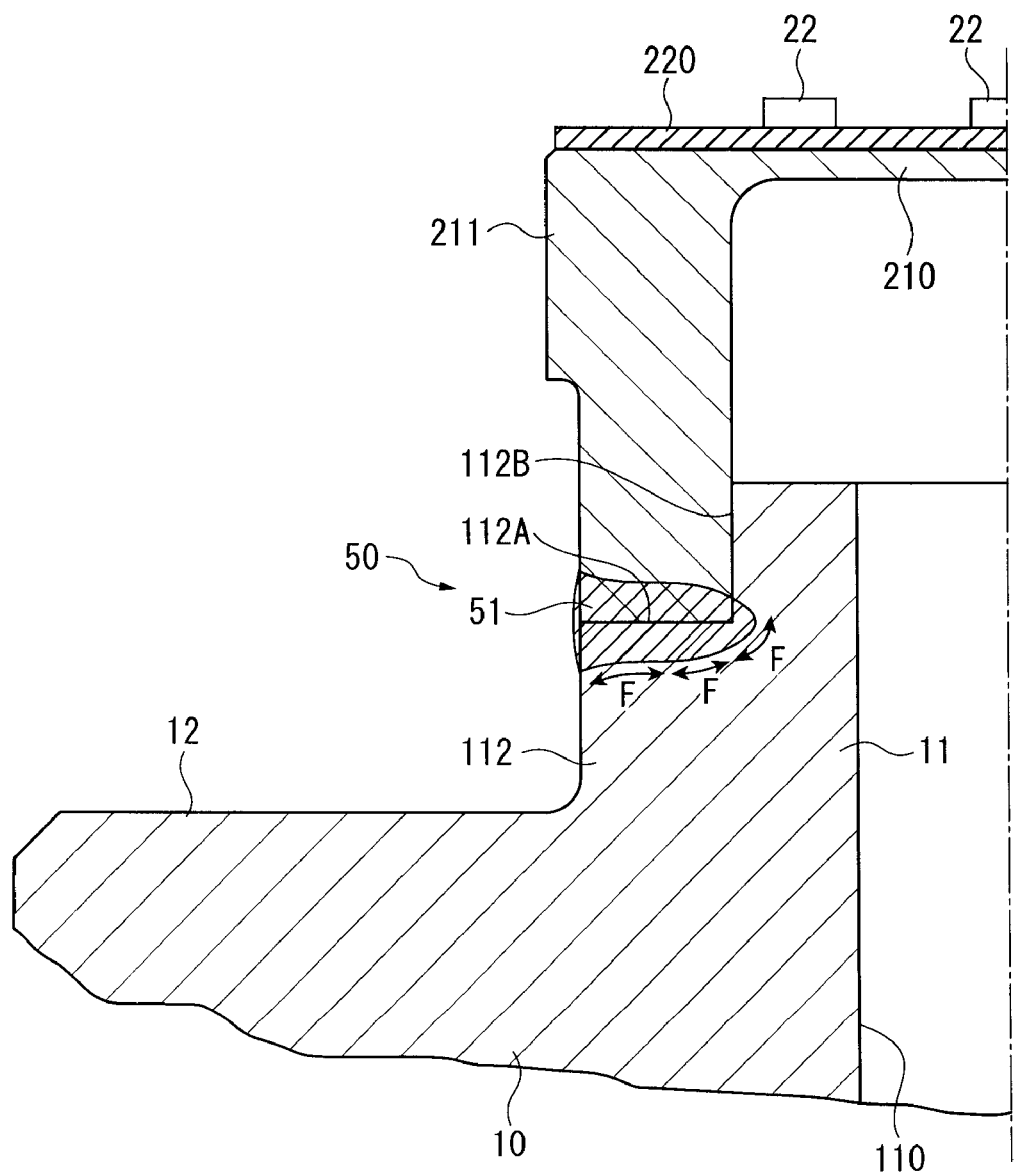
FIG. 4 is another front elevation showing the cross section of the weld portion after a first welding.

FIG. 4 is a front elevation showing a cross section of the weld portion 50 after the first welding. FIG. 5 is a front elevation showing the cross section of the weld portion 50 after the second welding.

In the first welding, the joint portion 112 of the pressure-introducing joint 10 is initially connected with the open end of the diaphragm 21. Specifically, the inner circumference of the cylindrical portion 211 of the diaphragm 21 is guided by the annular step 112B of the pressure-introducing joint 10 to be inserted.

Next, these members are placed in a vacuum chamber of an electron beam welder (not shown), and after vacuating the chamber, an electron beam is irradiated from the outer circumference of the portion to be welded toward the inner circumference thereof.

Irradiation of the electron beam causes a part of each of the joint portion 112 of the pressure-introducing joint 10 and the open end of the cylindrical portion 211 of the diaphragm 21 to melt, and material components of the respective members are dispersed and mixed to each other at the melted parts.

The pressure-introducing joint 10 and the diaphragm 21 are rotated and moved in the vacuum chamber while being combined with each other to irradiate the electron beam over the entire circumferences of the respective portions to be welded. After the welding is completed, the first weld bead 51 is formed to integrate the pressure-introducing joint 10 and the diaphragm 21. Here, in order to prevent leakage of the fluid to be measured through the first weld bead 51, the welding has to be performed completely and generation of cracks in a weld structure should be avoided.

During the first welding, the volume of the welded metal portion reduces on account of evaporation of a part of the melted metal. Subsequently, the melted metal starts shrinking in accordance with progress of cooling. The shrinkage causes residual strain (melt strain).

When the coefficient of thermal expansion of the material of the diaphragm 21 and the coefficient of thermal expansion of the material of the pressure-introducing joint 10 differ, large residual strain (melt strain) is generated on account of the difference in the coefficient of thermal expansion and temperature drop.

In either case, a force represented by F in FIG. 4 is constantly applied. The strain is transferred to the strain gauge 22 of the diaphragm 21 to deviate the output thereof.

Figure 5:
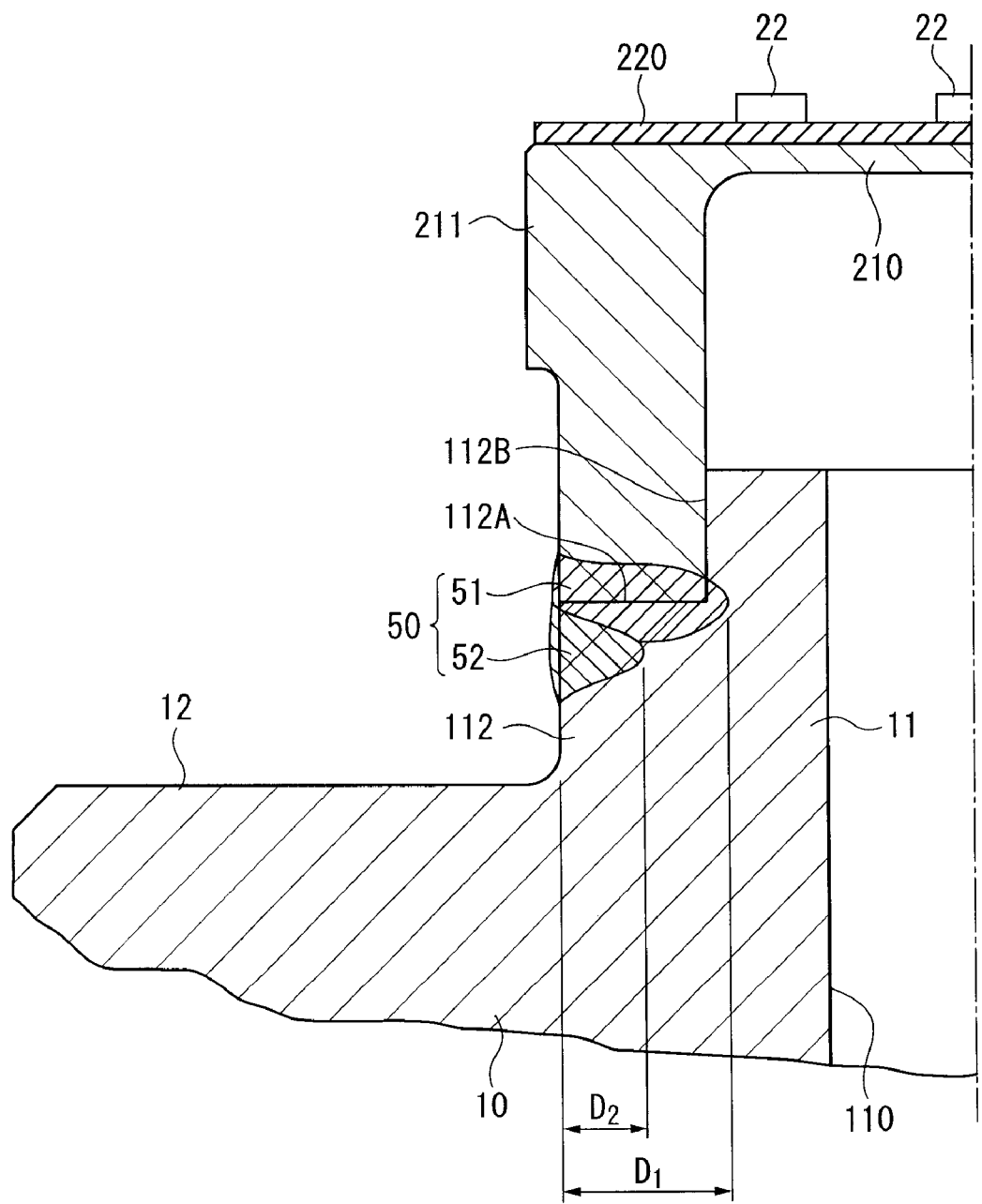
FIG. 5 is still another front elevation showing the cross section of the weld portion after a second welding.

Accordingly, as shown in FIG. 5, the pressure-introducing joint 10 is welded in the second welding in parallel to the first weld bead 51 formed during the first welding.

The weld in the second welding is preferably partially overlaid on the first weld bead 51 and is preferably shallower than the depth of the first weld bead 51. More preferably, the depth $D_2$ of the second weld bead 52 is in the range of 40% to 60% of the depth $D_1$ of the first weld bead 51.

The second welding relaxes the welding strain to restrain the output variation of the strain gauge 22.

Advantage of Embodiment

With the manufacturing method of the pressure sensor of the embodiment of the present invention, the following advantages can be obtained.

(1) The first welding seals the cylindrical portion 211 of the diaphragm 21 and the pressure-introducing joint 10 with high reliability. The second welding relaxes the welding strain generated in the first welding.

In other words, the pressure sensor 1 with reliable sealing and little output variation on account of components strain can be provided by the manufacturing method of the pressure sensor of the present embodiment.

Since the pressure sensor 1 thus produced exhibits extremely small strain of the diaphragm 21, the processor for correcting the electric signal from the strain gauge 22 can be simplified. Since the arrangement and the calibration process can be simplified, the pressure sensor 1 can be provided with a low cost. Further, since the welding strain of the diaphragm 21 is extremely low, a pressure sensor 1 that is excellent in long-term stability can be provided.

(2) Since the depth $D_2$ of the weld conducted in the second welding is set in the range of 40 to 60% of the depth $D_1$ of the weld conducted in the first welding, the relaxing effect of the welding strain by the second welding can be sufficiently exhibited.

(3) In the electron beam welding, since the heating is performed by irradiating a high-density electron beam in vacuum, the welding can be completed within a short time. Further, the electron beam welding is widely available for welding different materials.

Further, the electron beam has a high energy density, and a deep welding in which an aspect ratio of a weld width and a weld depth is two or higher, and consequently, a welding joint can be performed without thermally affecting each of the diaphragm 21, the pressure-introducing joint 10 and the strain gauge 22.

(4) Since a typical strain gauge 22 is used as the strain detecting mechanism, the pressure sensor 1 can be easily manufactured with low cost.

[Modifications]

Incidentally, the present invention is not limited to the embodiments described above, but includes modifications and improvements as long as an object of the present invention can be achieved.

Though the depth $D_2$ of the weld conducted in the second welding is set in the range of 40 to 60% of the depth $D_1$ of the weld conducted in the first welding in the embodiment, other arrangement is possible.

Since the depth $D_2$ of weld in the second welding has no influence on fixing and sealing performance of the pressure-introducing joint 10 and the diaphragm 21, the depth may be freely determined in accordance with the shape, material of the pressure-introducing joint 10 and the diaphragm 21, and expected magnitude and the like.

Though the first welding and the second welding are conducted by electron beam welding in the above embodiment, other arrangement is possible.

The first welding and the second welding may be conducted by other welding process. For instance, high energy-density welding, such as laser welding, may be employed instead.

Though the diaphragm 21 and the pressure-introducing joint 10 are respectively made of a single material in the above embodiment, the arrangement is not limited thereto. For instance, a laminate structure where another material is coated on a surface of each member may also be employed.

[Experiment]

The pressure sensor 1 was manufactured according to the above-described manufacturing method and offset voltage, i.e. an output when no pressure was applied to the pressure detector 20, was measured.

Figure 6:
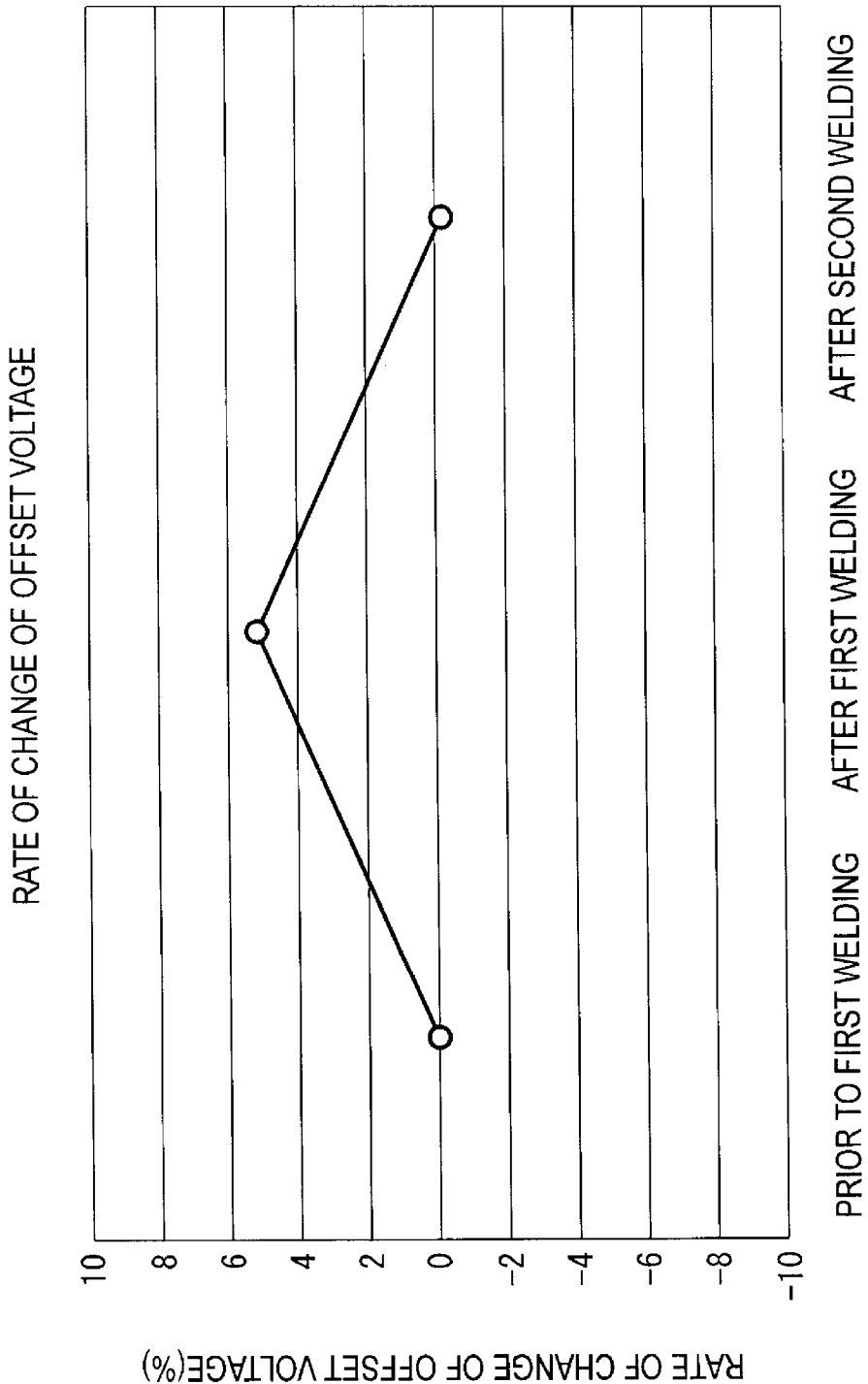
FIG. 6 is a graph showing a rate of change of offset voltage of the circuit portion of the embodiment of the present invention.

Rate of change of the offset voltage of the circuit portion 30 measured prior to the first welding, after the first welding and the second welding is shown in FIG. 6.

As shown in FIG. 6, the offset voltage of the circuit portion 30 was raised on account of the welding strain caused during the first welding. However, since the welding strain was relaxed after the second welding, the offset voltage substantially returned to a value before the first welding.

Accordingly, it can be observed that the welding strain was relaxed to restrain the output variation of the strain gauge 22.

The priority application Number JP2007-230322 upon which this patent application is based is hereby incorporated by reference.

What is claimed is:

1. A method for manufacturing a pressure sensor that is adapted to measure pressure of a fluid, the pressure sensor comprising:
 a pressure detector having a bottomed cylindrical member with a bottom including a thin-wall portion and a strain detecting mechanism provided on one side of the bottom for detecting a strain of the bottom; and,
 a pressure-introducing joint for introducing the fluid to be measured into the bottomed cylindrical member, the pressure-introducing joint comprising an annular joint surface and an annular step for receiving an inner circumference of the cylindrical member of the pressure detector, the method comprising the steps of:
welding by butt-welding an end of the cylindrical portion of the bottomed cylindrical member and an end of the pressure-introducing joint at the joint surface to a depth beyond the annular step; and
melting the pressure-introducing joint in parallel to a weld bead formed by the welding and partially overlaid on a periphery of the weld bead, a depth of the melting being shallower than the depth of the welding.

2. The method according to claim 1, wherein the depth of the melting is in a range of 40% to 60% of the depth of the welding.

3. The method according to claim 1, wherein the welding and the melting are conducted by an electron beam welding.

4. The manufacturing method of the pressure sensor according to claim 1, wherein the strain detecting mechanism is a strain gauge.

5. A pressure sensor for measuring a pressure of a fluid, comprising:

a pressure detector having a bottomed cylindrical member with a bottom including a thin-wall portion and a strain detecting mechanism provided on one side of the bottom for detecting a strain of the bottom;

a pressure-introducing joint for introducing the fluid to be measured into the bottomed cylindrical member, the pressure-introducing joint comprising an annular joint surface and an annular step for receiving an inner circumference of the cylindrical member of the pressure detector;

a weld bead formed by butt-welding an end of the cylindrical portion of the bottomed cylindrical member and an end of the pressure-introducing joint at the joint surface to a depth beyond the annular step; and a melt bead formed by melting the pressure-introducing joint in parallel to the weld bead, said melt bead being partially overlaid on a periphery of the weld bead, wherein a depth of the melt bead is shallower than a depth of the weld bead.

* * * * *

UNITED STATES PATENT AND TRADEMARK OFFICE
CERTIFICATE OF CORRECTION

PATENT NO. : 7,748,276 B2  Page 1 of 1
APPLICATION NO. : 12/205122
DATED : July 6, 2010
INVENTOR(S) : Kaneko et al.

It is certified that error appears in the above-identified patent and that said Letters Patent is hereby corrected as shown below:

In Column 8, Line 56, in Claim 1, delete "measure pressure" and insert -- measure a pressure --

Signed and Sealed this

Second Day of November, 2010

David J. Kappos
*Director of the United States Patent and Trademark Office*